June 23, 1953  R. O. DOSS  2,642,615
CURVED WINDSHIELD AND WIPER
Filed Oct. 1, 1948  4 Sheets-Sheet 1
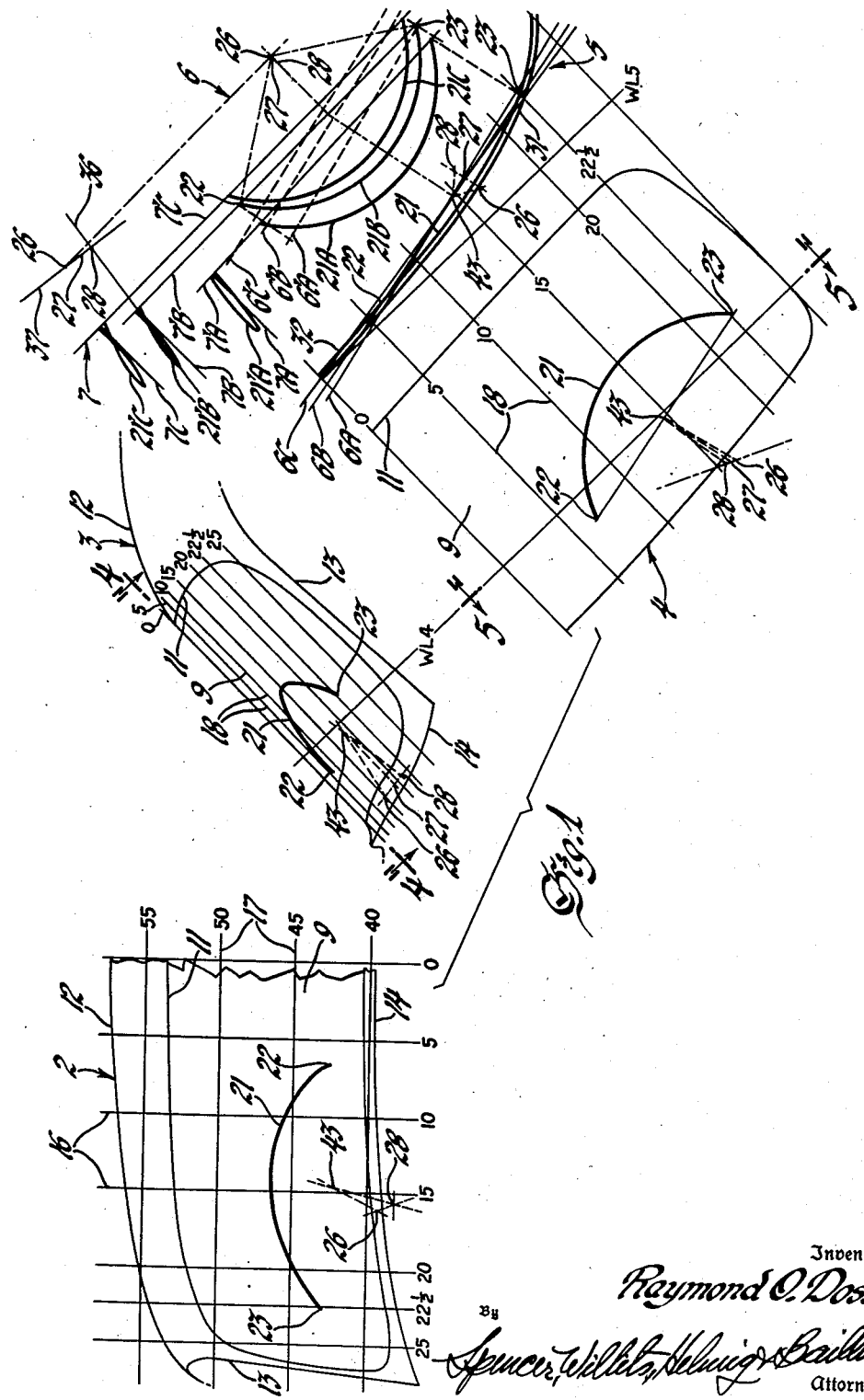
Inventor
Raymond O. Doss
By
Spencer, Willits, Helwig & Baillie
Attorneys June 23, 1953 — R. O. DOSS — 2,642,615
CURVED WINDSHIELD AND WIPER
Filed Oct. 1, 1948 — 4 Sheets-Sheet 2
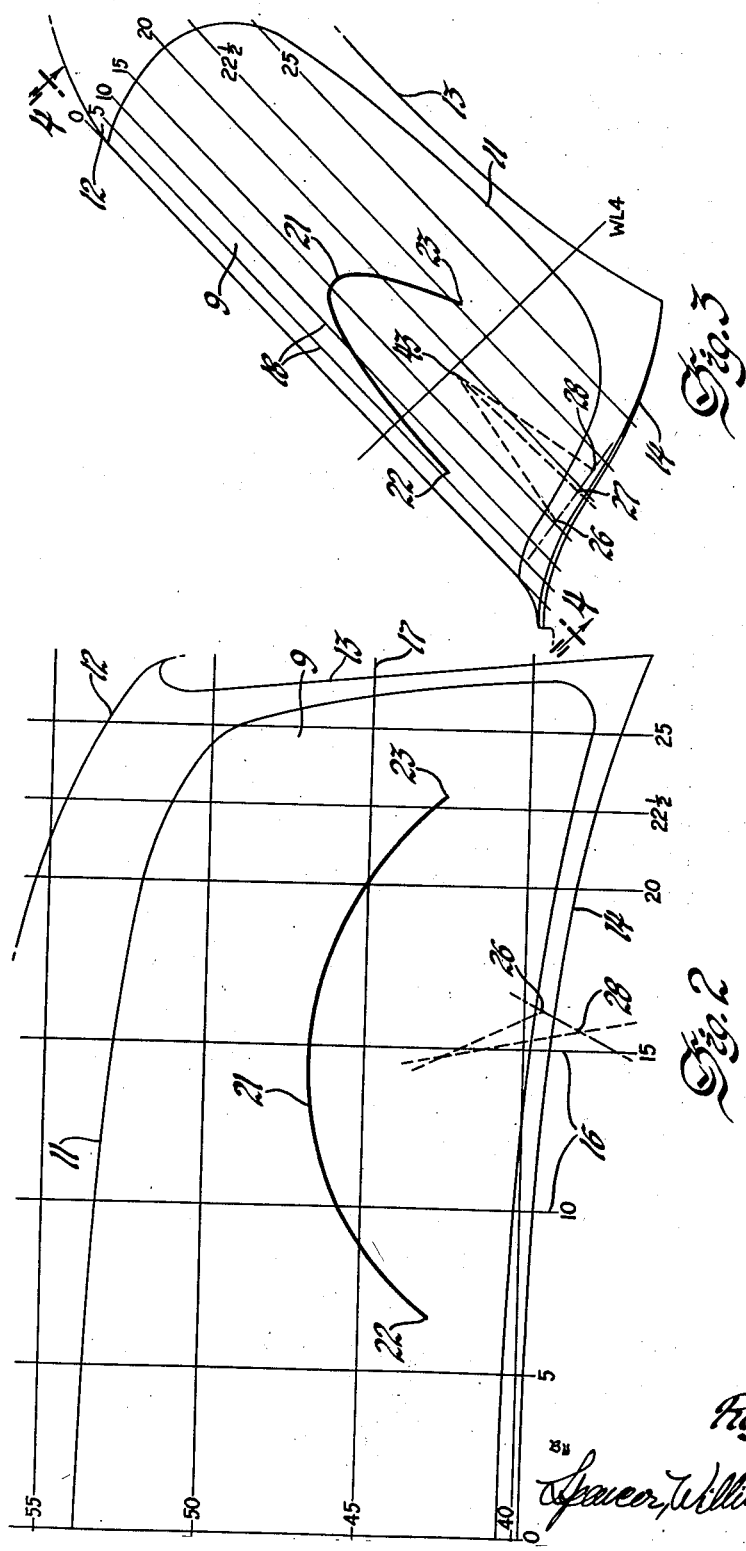
Inventor
Raymond O. Doss
By Spencer, Willits, Helwig & Baillio
Attorneys

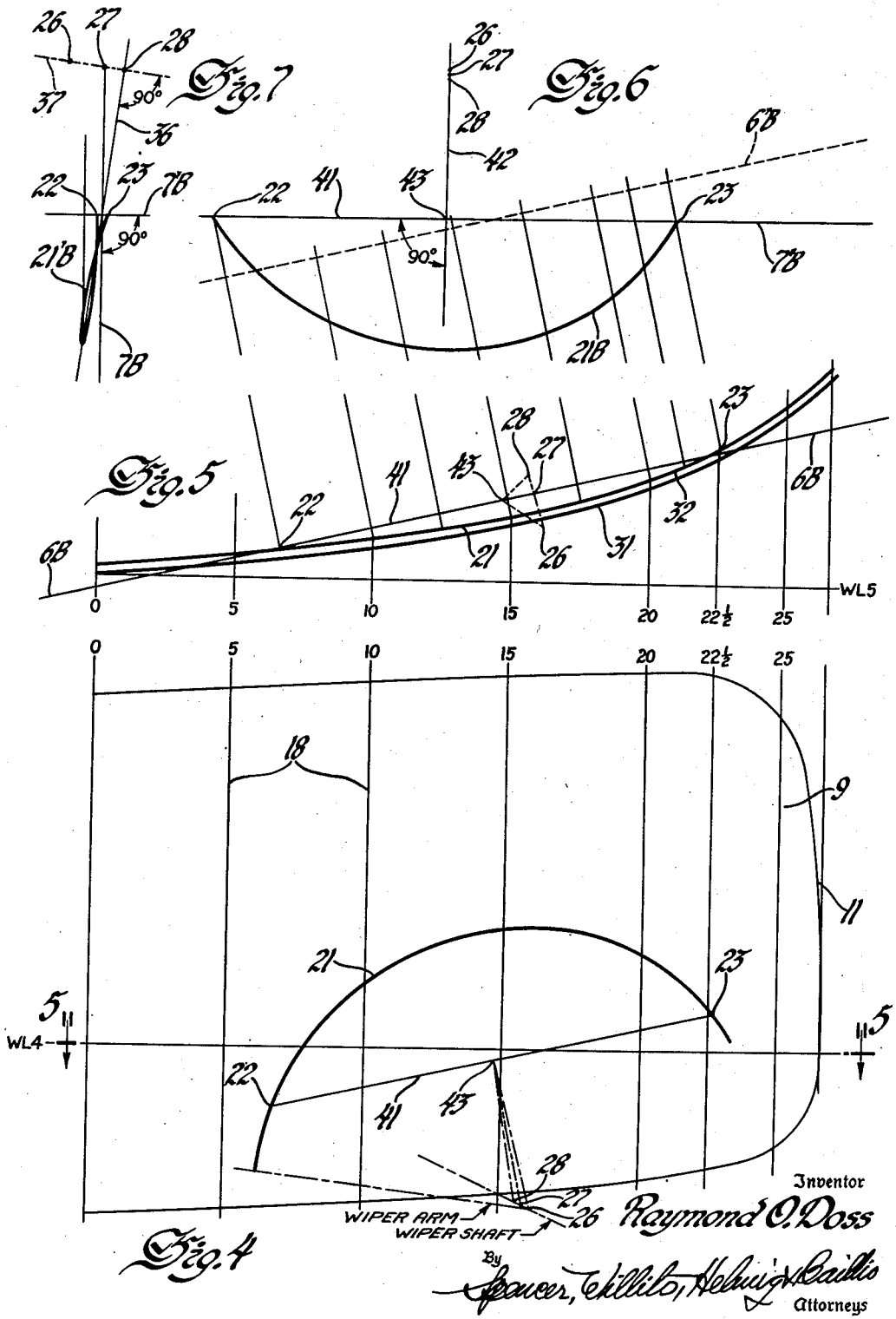

June 23, 1953 R. O. DOSS 2,642,615
CURVED WINDSHIELD AND WIPER
Filed Oct. 1, 1948 4 Sheets-Sheet 4

Inventor
Raymond O. Doss
By
Spencer Willits, Helwig & Bailho
Attorneys

Patented June 23, 1953

2,642,615

UNITED STATES PATENT OFFICE 2,642,615

CURVED WINDSHIELD AND WIPER

Raymond O. Doss, Birmingham, Mich., assignor to General Motors Corporation, Detroit, Mich., a corporation of Delaware Application October 1, 1948, Serial No. 52,308

3 Claims. (Cl. 15—255)

This invention relates to a windshield wiper for a curved windshield, and more particularly to the location of a windshield wiper and its drive shaft axis with respect to a curved windshield.

The object of this invention is to locate the drive shaft axis for the wiper arm mechanism with respect to a curved windshield at the proper angle to obtain the minimum variation in the angle between the drive shaft axis and the blade arm, in order to minimize the pressure variations between the wiper blade and the curved windshield as the blade traverses the windshield.

Another object is to mount the drive shaft for the wiper arm perpendicular to a plane having the least variation from the surface curve of the wiper area of the windshield or the space curve of the mid-portion of the wiper as it traverses the curved windshield.

Another object is to provide a graphical method of determining the proper relation of the windshield wiper drive shaft axis to the curved windshield in order to maintain a substantially uniform blade pressure as the blade traverses the wiped area of the windshield.

Another object is to locate a windshield wiper drive shaft axis with respect to a curved windshield, so that the wiper pressure increases as the blade approaches the end of the stroke, and thus aids in retarding the blade and decreases as the blade leaves the end of the stroke to aid in accelerating the blade to normal speed.

The windshield wipers now employed on flat windshields generally consist of a stiff blade, an arm and a drive shaft. The drive shaft is mounted adjacent and perpendicular to the windshield. One end of the wiper arm is transversely pivoted to the wiper blade. The other end of the arm is rotatively fixed to the drive shaft to reciprocate the blade and wiper arm transversely pivoted to the drive shaft to allow adjustment toward and away from the windshield, and to allow for variation in the distance between the windshield and the end of the drive shaft. A spring is provided in the transverse pivot between the arm and shaft to maintain the blade pressure on the windshield. When this blade is employed on a flat windshield the angle between the arm and shaft will remain constant. Thus the blade pressure on the windshield will be constant. With the constant pressure and therefore load on the wiper motor, the normal reciprocating movement will not be changed.

This type of wiper has been adapted for use on curved windshields by several methods. One method, employing a flexible wiper blade, is satisfactory for windshields with a small general curvature. However, when the windshield has a more pronounced curve, the angle between the wiper arm and the shaft has a larger variation in order to maintain the end of the arm in contact with the windshield. The variation of this angle changes the spring tension, and thus the load on the wiper motor to cause the wiper blade to move at an irregular speed as it traverses the windshield.

Other methods have been proposed in which the windshield drive shaft is positioned obliquely with respect to the vertical elements of the curved windshield. This arrangement will enable a windshield wiper blade to traverse a curved surface such as a cone, but will not provide a solution for use with irregular curved surfaces.

The present trend in automotive styling has produced a curved windshield. Each section or half of the windshield has a curve with a substantially flat portion near the center of the car and a sharply curved portion near the side of the car, as shown in the drawings. The drive shaft should not be located below the flat portion of the curved windshield near the center of the car. With the drive shaft in this location the wiper blade will move through about a quarter turn from a vertical position near the center of the car to a horizontal position near the side of the car. In the horizontal position the blade will lie along the axis of maximum curvature of the windshield. Proper cleaning could be obtained only if the blade could flex or bend to conform to the most sharply curved portion of the windshield.

Since the best results are obtained with the least bending of the wiper blade, the drive shaft axis is located in accordance with the present invention near the side of the car, so that the wiper blade will lie along the axis of the curve in the region of the least curvature. Thus the wiper blade is substantially horizontal as it traverses the flat portion of the windshield curve, and is nearer vertical and thus substantially parallel to the substantially straight vertical elements as it traverses the sharply curved portion of the windshield. However, when the drive shaft is located below the sharply curved portion of the windshield, the angular relation between the shaft and the windshield is critical. Slight variations in this angular relation will produce large variations in the angle between the wiper arm and shaft during each cycle of oscillation, and thus prevent proper wiper operation. The correct angular relation between the wiper shaft and the windshield, when determined in accordance with this invention, will minimize the angular variation between the wiper arm and shaft.

In the drawings:

Figure 1 shows the body design profile views of the windshield portion of an automobile and the geometric solution for determining the position of the wiper shaft axis.

Figure 2 is an enlargement of the left front windshield profile view 2 of Figure 1 into a right front windshield profile view.

Figure 3 is an enlargement of the left side windshield profile view 3 of Figure 1.

Figure 4 is an enlargement of the auxiliary view 4 taken on the section of Figure 3 on the line 4—4.

Figure 5 is a transverse section of Figure 4 on the line 5—5 showing one trial section plane 6B—6B.

Figure 6 is a vertical section of Figure 5 on the trial plane line 6B—6B.

Figure 7 is an end view or cross section of Figure 6.

Figure 8:
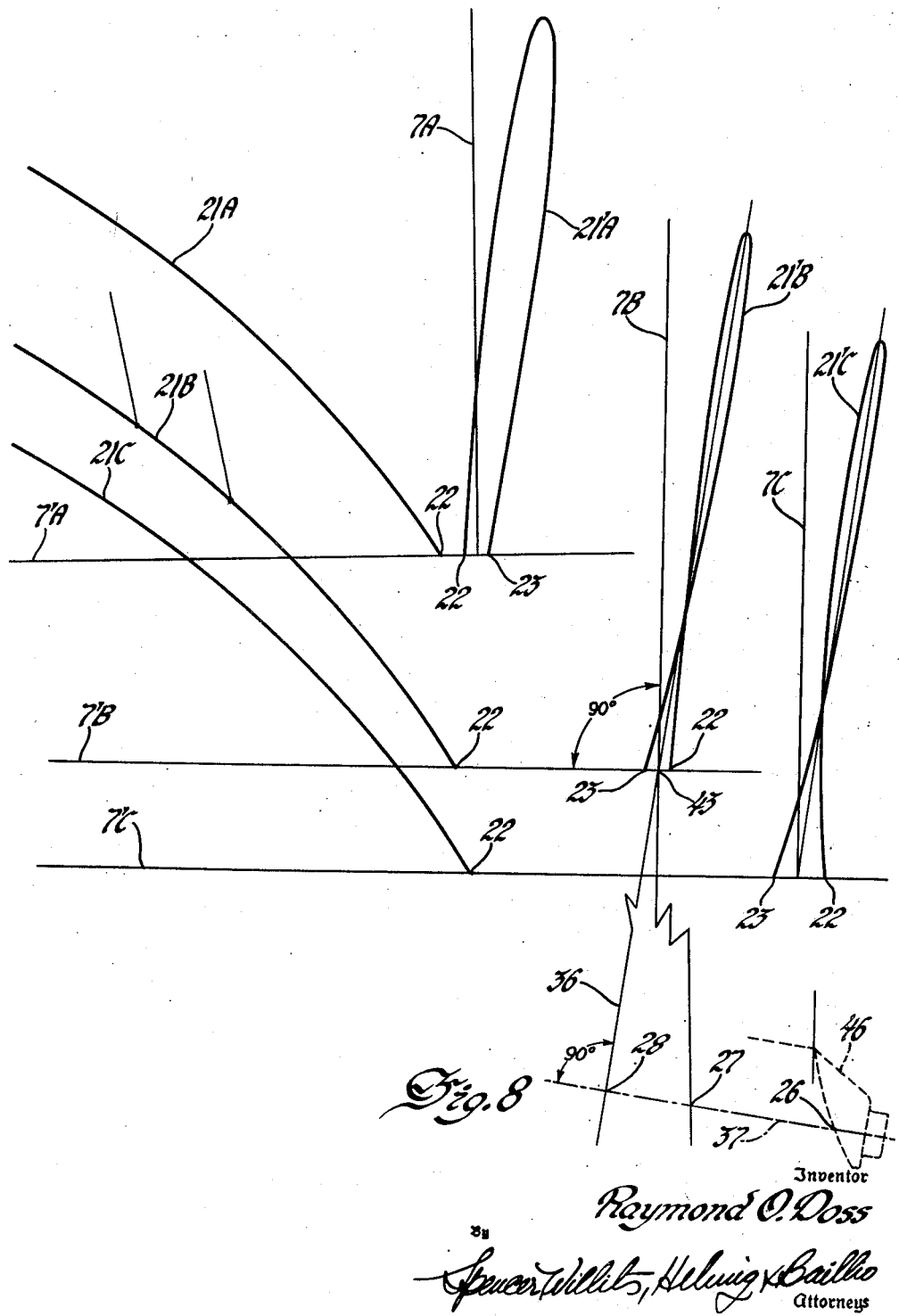
Figure 8 is a fragmentary enlargement of a portion of Figure 1 showing the final determination of the wiper shaft axis.

In the drawing, Figure 1 shows the complete drawing of the curved windshield profile and the geometric solution employed to determine the correct angular position of the wiper shaft axis. When the wiper shaft axis is located in accordance with this invention a conventional windshield wiper having a drive shaft oscillated by a motor, a wiper arm pivoted to the end of the drive shaft, and a spring connected between the shaft and arm to hold the blade in contact with the windshield, may be used on a curved windshield. Examples of suitable windshield wiper constructions are shown in United States Patents 1,946,073 to Horton et al. and 2,027,362 to Anderson et al.

The windshield profile in the car position as shown in the left front view 2 of Figure 1 and the right side view 3 of Figure 2 is taken from the body profile drawings. These views show the curvature of the windshield profile 9 and adjacent body surfaces, the windshield outline or frame 11, the roof line 12, the door frame line 13 and the hood opening line 14. The coordinate planes employed to locate the curves and as reference planes to obtain dimensions have been retained in the views because they aid the visual representation and explanation of the geometric solution. In the front view 2 of Figure 1 the vertical coordinate planes 16 extending lengthwise of the car appear as straight lines. From the central coordinate plane or center line 0 the coordinate planes 16 are dimensionally located and indicated as the 5-inch, 10-inch, etc., stations with regard to the center plane. The horizontal coordinate planes 17 are dimensioned from the ground and thus in these views are dimensionally indicated as 40-inch, 45-inch, etc. stations. The horizontal coordinates 17 extend through the front view 2 of Figure 1. The intersection of the vertical coordinate planes 16 with the windshield profile 9 locates the elements 18 of the windshield shown in the side view 3. The elements 18 are dimensionally numbered 0, 5, etc. to correspond to the vertical coordinate planes in which they are located. The straight and parallel relation of the elements 18 indicates that this windshield profile has no curvature in the direction of the elements 18. However, the use of a windshield with vertical curvature would not change the basic application of the principles of this invention. The varied spacing of the vertical coordinate planes and the elements indicates the windshield profile 9 curved in a direction perpendicular to the elements.

In order to show the true length of the elements 18 of view 3 of Figure 1 in the same spaced relation as shown in the front view 2, an auxiliary view 4, which is a section of view 3 on the section line 4—4, is constructed on work line WL4. The work line WL4 is drawn perpendicular to the elements 18 in view 3. The elements 18 of view 4 are drawn perpendicular to the work line WL4 with the same spacing along the work line as the coordinate planes of front view 2. The distances from the work line WL4 to the windshield frame 11 along each element 18 are measured in side view 3 and laid off along the corresponding element in auxiliary view 4 to determine the windshield frame outline 11 in auxiliary view 4. This view 4 is a projection on an auxiliary plane through section line 4—4, and perpendicular to the central coordinate plane 0.

When the windshield profile 9 and outline 11 is determined and defined, the position of the wiper arm pivot and the arm and blade length may be selected to achieve the best wiped area. This may be done in the drawing in view 4, but because of the numerous factors involved including the personal characteristics of drivers, it has been found that the wiped area for best vision should be determined by actual experimentation on a model of the car. When the wiped area is determined on a model, the blade and arm lengths are noted for design purposes and the arm pivot point 26 is marked on the body, and the path curve 21 traversed by the end of the wiper arm is marked on the windshield of the model car. The path curve 21 and the pivot point 26 are then transferred to the drawing. The curve 21 and pivot point 26 may be transferred to views 2 and 3 of Figure 1 by measuring the vertical and horizontal distances from the coordinate reference planes. However, it is easier to transfer the curve 21 directly to view 4. The elements 18 and work line WL4 are marked on the model car and measurements are taken on the car from the work line WL4 to the curve 21 along each element and laid off along the corresponding element in view 4 to determine the points of curve 21 with end points 22 and 23. The pivot point 26 may be located on auxiliary view 4 by measuring coordinates from the work line WL and an element on the car and transferring these dimensions to view 4. Then the curve 21 and pivot point 26 may be projected to the side view 3 and front view 2. Since the windshield profile 9 is curved, the wiper arm path curve 26 does not appear as a true circular arc in these views.

In order to locate the optimum position of the windshield wiper axis in relation to the windshield, an optimum plane which has the least variation from the wiper path curve must be determined. It has been found that the optimum plane may be located by a geometric solution which will show the deviation or variation of the wiper path curve from a series of trial planes. The solution is based on the auxiliary view 4 which shows the windshield profile 9, curve 21 and the true length of the elements 18. A transverse section 5 is made of the windshield profile and curve 21. If the windshield and the profile are the same, the profile curve 31 in view 5 is used in the remainder of the solution. However, in practice the windshield 32 is generally located behind the profile due to the thickness of the moulding. In the normal design the profile curve 31 and the front face of the windshield 32 will have substantially the same curvature. Thus the points 22 and 23 of curve 21 may be projected on the windshield face 32 without significant error.

Using the transverse section of curve 21 shown in view 5 of Figure 1, a trial plane 6A is passed through the curve. The location of trial plane 6A is empirically selected to approximate the curve 21 in view 5. Using trial plane 6A as a section plane the vertical sectional view 6 of Figure 1, which includes path curve 21A, is constructed on the work line 6'A shown as a dotted line for clarity. In constructing the end view 7 of Figure 1 of the vertical section of the path curve it is preferable to have a balanced curve. In order to have a balanced curve the work line 7'A is drawn through the end points 22 and 23 of curve 21A. The end sectional view 7 of Figure 1 is taken on the section plane 7A which is perpendicular to work line 7'A. The section plane 7A also represents the trial plane 6A in end sectional view 7. Thus the wiper path curve 21'A in view 7 shows the transverse or lateral variation of curve 21 from trial plane 6A. This curve shows a rather thick middle section and thus indicates a large variation.

Then a second trial plane 6B is selected and the similar curves 21B and 21'B are drawn. Since the curve 21'B is not as thick as curve 21'A the change of the trial plane from 6A to 6B is in the proper direction.

Selecting a third trial plane 6C rotated further in the same direction, the curve 21'C is obtained in the same manner. It will be noted that curve 21'B is thinner than either 21'A or 21'C. The curve 21'A is wider at the center, while curve 21'C is wider at the end. Selecting curve 21'B, which is the thinnest, the optimum plane 36 is drawn on the center line of this curve. Thus the optimum plane 36 is the mean plane of the thinnest variation curve. By positioning the windshield wiper axis 37 perpendicular to the optimum plane 36 the least variation between a straight wiper blade path and the true path over the curved windshield 32 is obtained.

In order to clearly show the relationship of the trial curves 21'A, 21'B and 21'C a portion of view 6 and view 7 of Figure 1 has been enlarged to show the relative size of these curves in Figure 8. The trial plane 6B produces the thinnest trial curve 21'B. Since rotation of the trial curve in either direction to 6A or 6C produces a thicker trial curve 21'A or 21'C, the trial plane 6B indicates the optimum trial plane. The optimum plane 36 drawn as a center line of curve 21'B intersects the section plane 7B on the line 41 or work line 7'B connecting the end points 22 and 23 of the path curve 21. The optimum wiper shaft axis 37 is drawn perpendicular to the optimum plane 36, and thus has a nonintersecting perpendicular relation with the line 41. The wiper shaft fitting 46 is shown in dotted lines in this view to illustrate its relative position to the optimum plane.

In order to clearly show all the details of this geometric solution employed to determine the optimum plane for the proper angular position of the wiper drive shaft, the views 2 to 7 of Figure 1 have been enlarged to show the details of the solution for the optimum trial curve 21'B. The car position views 2 and 3 are shown enlarged in Figures 2 and 3 with the right front view 2 reversed to show the left front windshield in Figure 2, which was considered the more conventional companion view to the left side view in Figure 3. The auxiliary view 4 is shown enlarged to the same scale as Figures 2 and 3 in Figure 4. The geometric solution is based on Figure 4, and involves the selection of the trial planes and the sections shown in Figures 5, 6 and 7.

Referring to Figure 4, the auxiliary view of the windshield profile 9 shows the elements 18, the work line WL4, the wiper arm path curve 21 and arm pivot point 26 as determined above. The position of the wiper arm in the parked position is also shown in the dot-and-dash line. In finding the wiper axis position the sectional view Figure 5 of the windshield profile 9 is made on a plane through the work line WL4 or section line 5—5 and perpendicular to the elements 18. Figure 5 is constructed on the work line WL5, which is parallel to the work line WL4. The measurements are taken in Figure 3 from the element 0 along the work line WL4 to each element and laid off perpendicular to work line WL5 along the corresponding element to determine the points of the section curve 31 of the windshield profile 9. The pivot point 26 is located with respect to the section curve by projecting parallel to the elements of Figure 4, and located above work line WL5 the same distance the pivot point 26 is located in Figure 3 from the element 0.

In building the car the windshield must be located inside the profile lines by the thickness of the windshield frame or moulding. Thus the front face 32 of the windshield is located a uniform distance inside of the profile section 31. Since the windshield and profile section curves are almost exactly alike, the wiper arm length and the arm path curve 26 on the profile surface 9 will be practically the same as for the windshield surface 31. If the curvature or the thickness of the windshield moulding introduced a perceptable error, it would be necessary to employ the windshield glass profile curves in Figures 2 and 3. However, in view of the fact that these curves are not ordinarily drawn in practice and the error involved is negligible, the body profile curves are here used.

The points 22 and 23 are located on the windshield section 32, Figure 5, by projecting from points 22 and 23 in Figure 4 parallel to the elements. A trial plane 6B is passed through the section 32 parallel to the elements. The selected location of the first plane can only be based on experience. In general, it should be close to the points 22 and 23 as shown in the drawing. For this description the trial plane 6B that gave the optimum plane has been used in order to show the transfer of the wiper shaft axis from the solution to the car position, Figures 2 and 3.

Figure 6 is a section of path curve 21 taken on the trial plane 6B of Figure 5 and constructed on work line 6'B which is parallel to trial plane 6B. The element lines are drawn from the points on the windshield section representing the elements or the intersection of the element planes and the windshield section 32 perpendicular to the work line 6'B or trial plane 6B. The distances along the elements from work line WL4 to curve 21 are then laid off along the respective elements from work line 6'B to give the points of curve 21B in Figure 6. The points 22 and 23 of Figure 6 are now connected to produce work lines 7'B.

The trial curve 21'B shown in Figure 7 is a section of curve 21B of Figure 6 on the section plane 7B which is perpendicular to work line 7'B. The curve 21'B of Figure 7 is plotted by projecting the points from Figure 6 parallel to the work line 7'B, and locating the points a perpendicular distance from section plane 7B equal to the perpendicular distance from the trial plane 6B to the windshield section 32 or curve 21, which is along the projected element lines of curve 21B in Figure 6.

Since the trial curve 21'B of Figure 7 is the narrowest curve obtainable with this windshield and path curve 21, the optimum plane 36 is drawn through the center of the curve 21'B of Figure 7. The wiper drive shaft axis 37 is located perpendicular to the optimum plane 36. However, before the shaft axis 37 can be located, the pivot point 26 must be located with respect to the trial curve 21'B. The wiper arm pivot point 26 having been determined on the model car and located in the auxiliary view and car position views 2 and 3, is projected parallel to the elements of the auxiliary Figure 4 and located in Figure 5 above work line WL5 the distance it is from element 0 in the side view, Figure 3. With the point 26 located in relation to section 32 in Figure 5, it is projected to Figure 6 on a perpendicular to trial plane 6BB and located from work line 6'B the same distance that point 26 is from work line WL4 in Figure 4. For use in the solution to be explained later a construction line 42 is drawn from point 26 perpendicular to line 41 or 7'B which connects the end points 22 and 23 of curve 21B in Figure 6. The point 26 is then projected to Figure 7 parallel to work line 7'B and located a perpendicular distance from section plane 7B as point 26 is from trial plane 6B in Figure 5.

From the point 26 thus located with relation to curve 21'B of Figure 7 a perpendicular is dropped to the optimum plane 36 to determine the wiper shaft axis 37. In order to project this line into the car position views and to have a check on the accuracy, three points on the axis are used. The point 26 has been located. The point 27 is at the intersection of the axis and the section plane 7B, and point 28 at the axis and the optimum plane 36. The points 27 and 28 located with respect to curve 21'B of Figure 7 are projected parallel to the work line 7'B to the construction line 42 as 27 and 28 in relation to curve 21B of Figure 6. The points are then projected parallel to the elements of curve 21B of Figure 6 or perpendicular to trial plane 6B, and located as points 27 and 28 with regard to the trial plane 6B the same distance therefrom as from section plane 7B. The point 43 on work line 7'B is projected parallel to the elements of curve 21B of Figure 6 to the trial plane 6B of the section curve 32 in Figure 5. The points 27 and 28 are projected on the auxiliary view parallel to the elements and located from work line WL4 the same distance as they are from work line 6'B, Figure 6. The points 26, 27 and 28 will be located in the side view, Figure 3, the same distance from work line WL4 as in the auxiliary view and the same distance from element 0 as from work line WL5 in Figure 5, and in the front view the same distance from the horizontal coordinator as in the side view and from the vertical coordinator as in the auxiliary view. With the wiper shaft axis 37 located in the front and side views in car position the necessary measurements can be made to locate the wiper axis on the car.

Thus in accordance with the invention the position of the wiper axis for an irregularly curved windshield may be determined to produce a minimum variation between the normal wiper path and the path on the windshield surface.

The position of the windshield wiper axis may also be located to produce a corrective variation in the pressure between the wiper and windshield to increase or decrease the load on the wiper motor over certain portions of the wiper path. When reciprocating motors, such as the vane type vacuum motors are used to drive a windshield wiper on curved glass, it is advantageous to provide additional load as the blade approaches both ends of the path and to decrease this load as the blade leaves the end of the path. This may be done by making the external angle between the wiper axis 37 and the optimum plane 36 somewhat larger than 90° as shown in Figure 7. An increase of from 1 to 5 degrees is normally sufficient to provide the required variation in wiper blade pressure. Thus the drive shaft or wiper shaft axis 37 is disposed with respect to the optimum plane 36 to subtend a horizontal angle of 90° and a vertical exterior angle on the windshield side or toward the windshield of 90 to 95 degrees. With the angle larger than 90° the wiper pressure will increase as the blade approaches each end of the stroke and decrease as the blade leaves each end of the stroke. Thus the variation in pressure on the wiper blade will assist the deceleration and acceleration that occurs at the end of each stroke of the reciprocating wiper blade.

The invention though illustrated by the above specific embodiments is subject to modification by those skilled in the art which falls within the scope of the appended claims.

I claim:

1. The combination with an irregularly curved windshield having a convex outer surface, of a windshield wiper assembly having a drive shaft axis and a wiper arm, said wiper arm having an end describing a non-planar path curve on said windshield during the oscillation of said arm about said axis, said axis being mounted perpendicular to a plane plurally intersecting said non-planar path curve and whose maximum displacement from said curve is a minimum distance as compared to other planes so intersecting said curve.

2. The combination with an irregularly curved windshield having a convex outer surface, of a windshield wiper assembly having a drive shaft axis and a wiper arm, said wiper arm having an end describing a non-planar path curve on said windshield during the oscillation of said arm about said axis, said axis being mounted perpendicular to a plane intersecting the path curve at only three points and whose maximum displacement from said curve is a minimum distance as compared to other planes so intersecting said curve.

3. The combination with an irregularly curved windshield having a convex outer surface, of a windshield wiper assembly having a drive shaft axis and a wiper arm, said wiper arm having an end describing a non-planar path curve on said windshield during the oscillation of said arm about said axis, said axis intersecting an optimum plane which plurally intersects said non-planar path curve and whose maximum displacement from said curve is a minimum distance as compared to other planes so intersecting said curve, said axis lying within a vertical plane perpendicularly related to said optimum plane, said axis also being obtusely disposed to said optimum plane and said convex outer windshield surface.

RAYMOND O. DOSS.

References Cited in the file of this patent

UNITED STATES PATENTS

| Number | Name | Date |
|---|---|---|
| 2,254,343 | Zierer | Sept. 2, 1941 |
| 2,356,424 | Paton | Aug. 22, 1944 |
| 2,376,012 | Sacchini | May 15, 1945 |
| 2,387,564 | Christel | Oct. 23, 1945 |
| 2,401,961 | Rappl | June 11, 1946 |